(12) United States Patent
Yeoh et al.

(10) Patent No.: US 10,762,431 B2
(45) Date of Patent: Sep. 1, 2020

(54) LOW PROBABILITY TRANSITIONS AND BOUNDARY CROSSING INTO DISALLOWED STATES FOR A MORE OPTIMAL SOLUTION

(71) Applicant: The Aerospace Corporation, El Segundo, CA (US)

(72) Inventors: Terence Yeoh, Pasadena, CA (US); Nehal Desai, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 257 days.

(21) Appl. No.: 15/968,203

(22) Filed: May 1, 2018

(65) Prior Publication Data
US 2019/0130287 A1    May 2, 2019

Related U.S. Application Data

(63) Continuation-in-part of application No. 15/798,020, filed on Oct. 30, 2017.

(51) Int. Cl.
*G06N 5/02* (2006.01)
*G06K 9/62* (2006.01)
*G06K 9/46* (2006.01)

(52) U.S. Cl.
CPC ........... *G06N 5/025* (2013.01); *G06K 9/6247* (2013.01); *G06K 9/46* (2013.01)

(58) Field of Classification Search
None
See application file for complete search history.

(56) References Cited

U.S. PATENT DOCUMENTS

| 6,393,154 B1 | 5/2002 | Lafe | |
|---|---|---|---|
| 2004/0024724 A1* | 2/2004 | Rubin | G06N 5/025 706/55 |
| 2010/0027895 A1 | 2/2010 | Noguchi et al. | |

OTHER PUBLICATIONS

Mark Roz, "Non-Final Office Action", dated Oct. 10, 2019, U.S. Appl. No. 15/798,020.
RPSContest website available at http://www.rpscontest.com/ (last accessed May 1, 2018).
Mark Roz, "Notice of Allowance", dated Feb. 11, 2020, U.S. Appl. No. 15/798,020.
Mark Roz, "Restriction Requirement", dated Apr. 17, 2020, U.S. Appl. No. 16/166,691.

* cited by examiner

*Primary Examiner* — Mark Roz
(74) *Attorney, Agent, or Firm* — LeonardPatel PC

(57) ABSTRACT

Artificial intelligence (AI) techniques that map disallowed states and enable access to those states under certain conditions through a search algorithm are disclosed. In other words, scenario boundaries may be crossed by jumping from one scenario that is less desirable or even has no solution to another scenario that is more desirable.

17 Claims, 14 Drawing Sheets

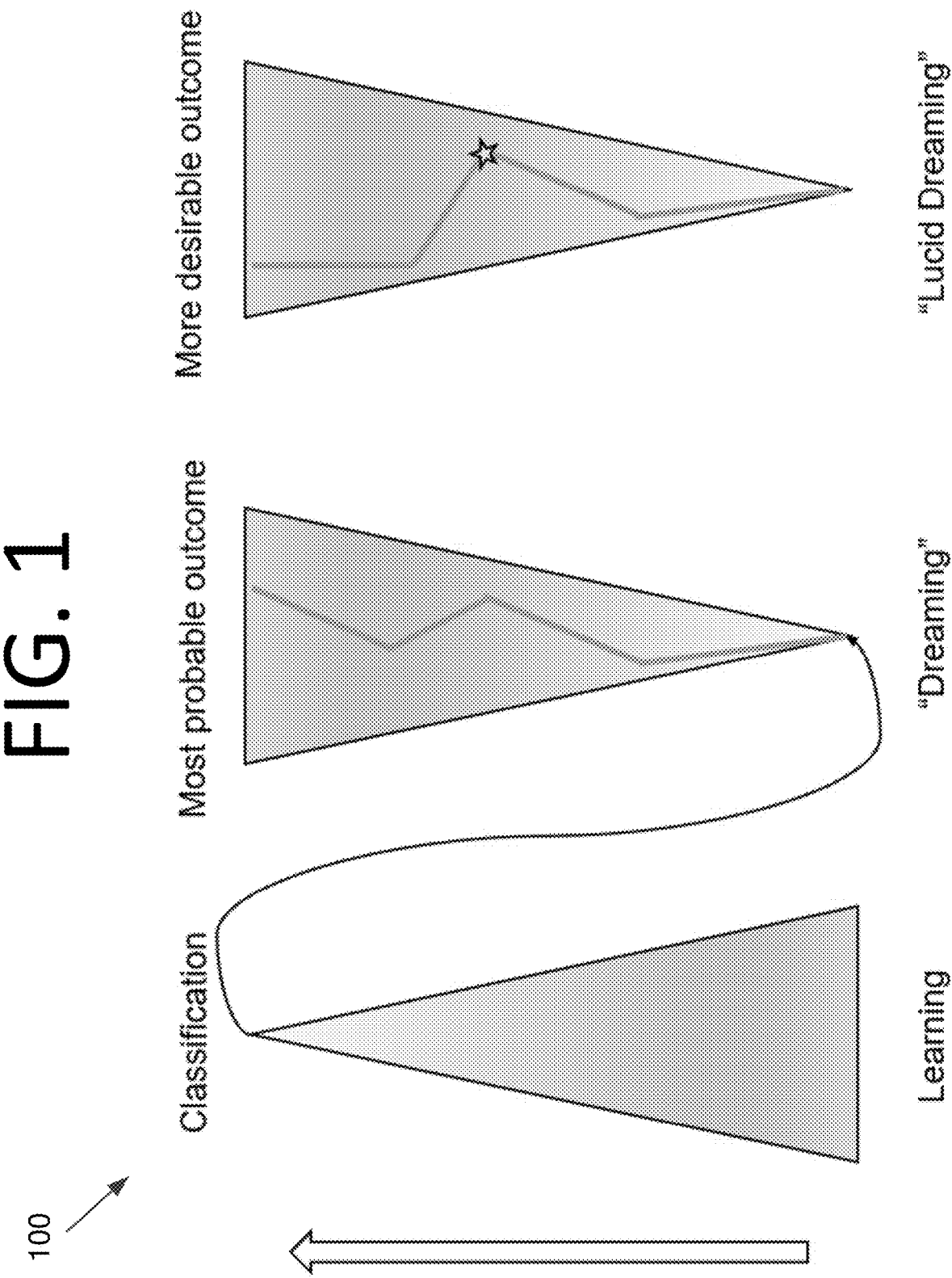

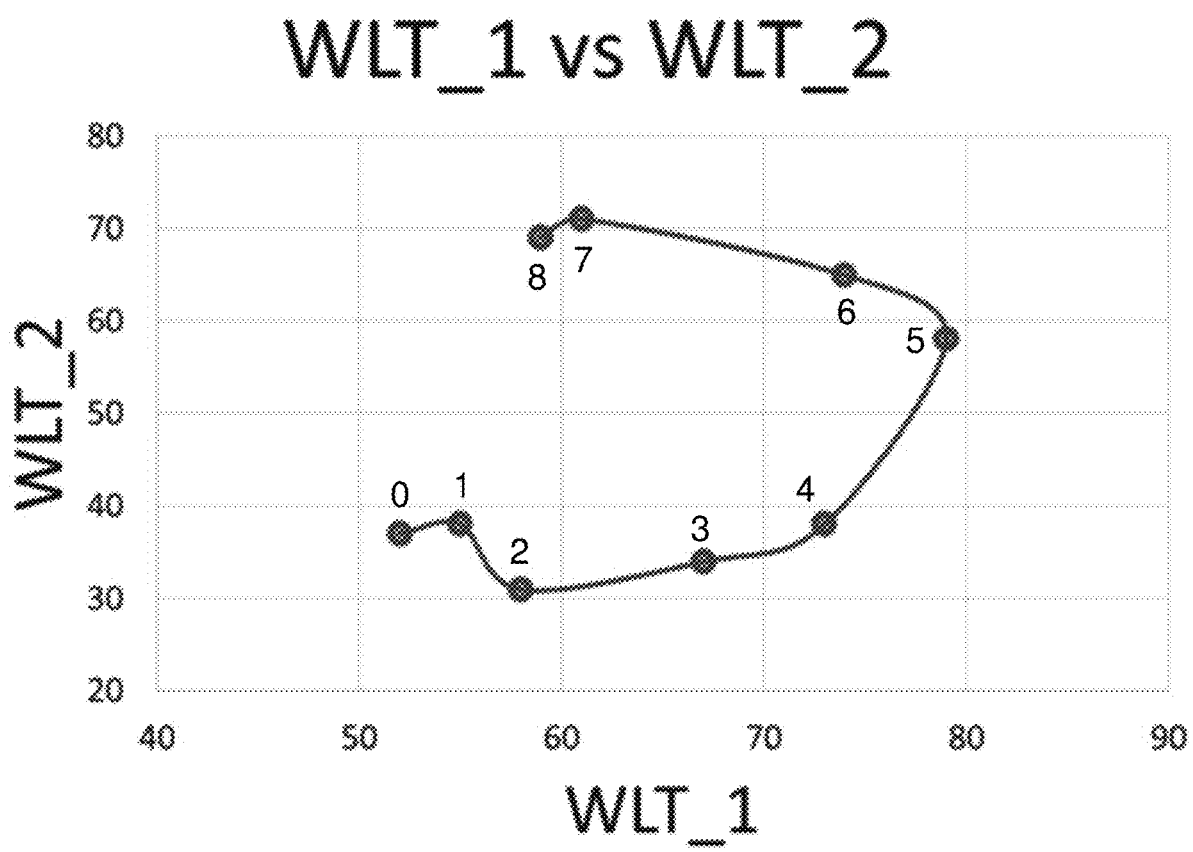

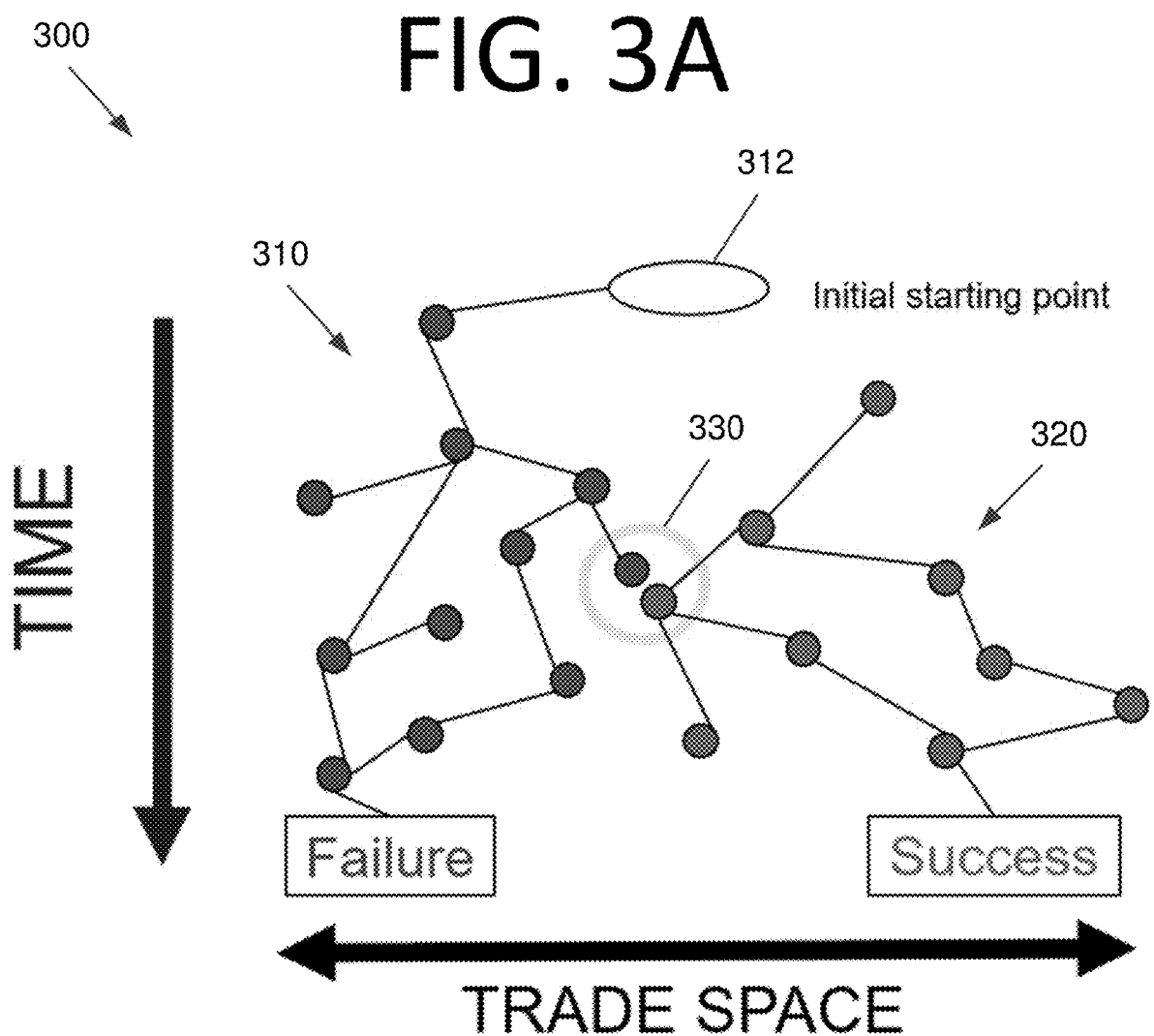

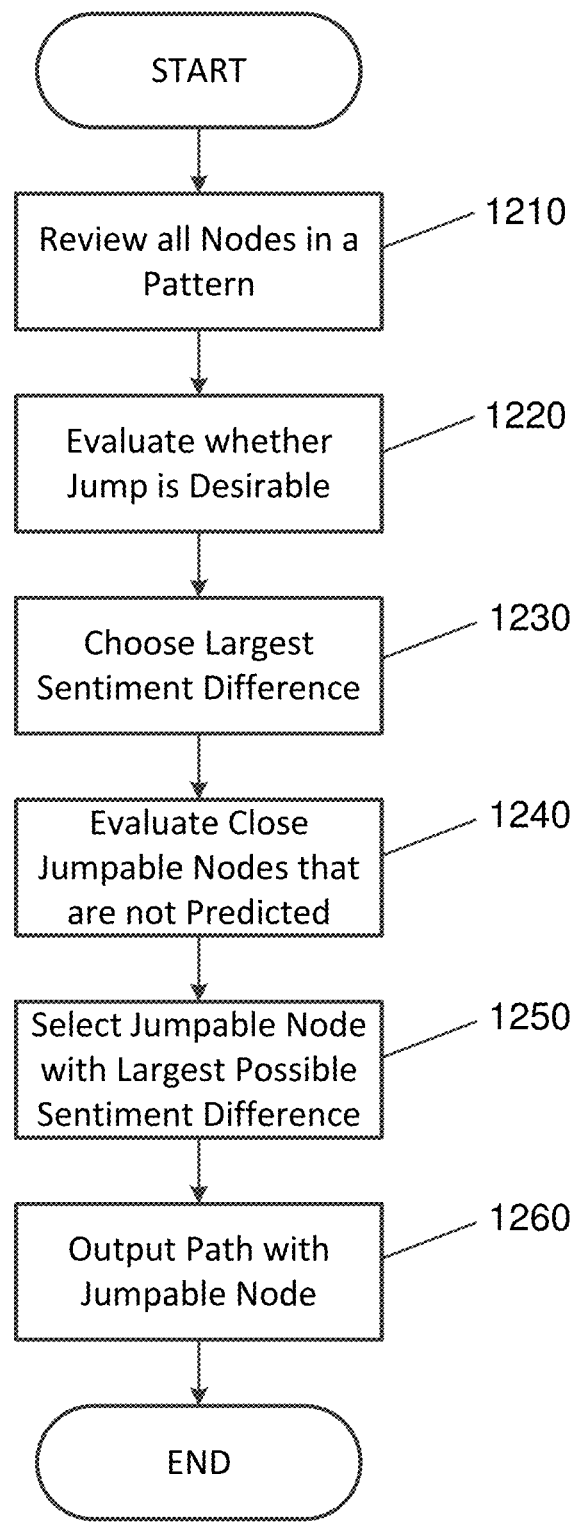

ered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

LOW PROBABILITY TRANSITIONS AND BOUNDARY CROSSING INTO DISALLOWED STATES FOR A MORE OPTIMAL SOLUTION

CROSS-REFERENCE TO RELATED APPLICATION

This application is a continuation-in-part (CIP) of U.S. Nonprovisional patent application Ser. No. 15/798,020 filed Oct. 30, 2017. The subject matter of this earlier filed application is hereby incorporated by reference in its entirety.

FIELD

The present invention generally pertains to artificial intelligence (AI), and more specifically, to AI techniques that map disallowed states and enable access to those states under certain conditions through a search algorithm.

BACKGROUND

Current AI technologies are rule-based systems that utilize Bayesian networks or multi-objective optimization techniques to completely map out the possible decision space and provide the best answer. For instance, AI software that has been trained to play chess maps out all of the possible allowed moves and attempts to select the optimal next move based on the current state of the pieces in the game. However, these techniques do not map disallowed states. This strict adherence to rules makes current AI approaches suboptimal, or even dangerous, for certain applications. Accordingly, an improved approach may be beneficial.

SUMMARY

Certain embodiments of the present invention may be implemented and provide solutions to the problems and needs in the art that have not yet been fully solved by conventional AI technologies. For example, some embodiments of the present invention pertain to AI techniques that map disallowed states and enable access to those states under certain conditions through a search algorithm. In some embodiments, this algorithm is robust against limited information scenarios because it assumes all states are possible.

In an embodiment, a computer program is embodied on a non-transitory computer-readable medium. The program is configured to cause at least one processor to map trade space versus time for a plurality of scenarios, whether reachable or not within rules of a system. Each pathway in the plurality of scenarios includes a plurality of nodes. The program is also configured to cause the at least one processor to, while following a pathway from an initial starting point, search for nearby nodes from otherwise unreachable outcomes that provide a better solution. When a node is found that is proximate within the predetermined distance and is associated with a pathway that provides a better solution, the program is further configured to cause the at least one processor to jump to the proximate node and follow the path to the better solution and output the path with the better solution.

In another embodiment, a computer-implemented method includes performing principal component analysis (PCA) on raw data, by a computing system, to generate relational sequences in trade space. The trade space represents relative relationships in the raw data. The computer-implemented method also includes mapping a solution space based on the generated relational sequences and replaying a plurality of scenarios, by the computing system, to determine pinch points where path structures are proximate to one another and more favorable outcomes can be jumped to. The computer-implemented method further includes generating a new solution path, by the computing system, based on one or more jumps to more favorable outcomes.

In yet another embodiment, a computer-implemented method includes reviewing all nodes in a pattern, by a computing system, to determine a most likely node for a jump and evaluating whether the jump to the most likely node is desirable using a sentiment difference between the most likely node for the jump and at least one node that is not previously known to be a valid state, but is still proximate to the most likely node for the jump. The computer-implemented method also includes, from all predicted moves, choosing a largest sentiment difference and evaluating all jumpable nodes within a predetermined proximity that are not predicted by pattern recall, by the computing system. The computer-implemented method further includes selecting a jumpable node within the predetermined proximity with a largest positive sentiment difference between itself and the most likely node for the jump and outputting a path with the jumpable node as a path with a better solution, by the computing system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 illustrates a progression from learning to "dreaming" and "lucid dreaming," according to an embodiment of the present invention.

FIG. 2B shows a principal component path of WLT_1 vs. WLT_2 for frames 0-8 in PCA space, according to an embodiment of the present invention.

FIG. 3A is a graph illustrating success and failure boundaries, according to an embodiment of the present invention.

FIG. 12 is a flowchart illustrating a process for providing a path with a better solution, according to an embodiment of the present invention.

DETAILED DESCRIPTION OF THE EMBODIMENTS

Figure 2A:
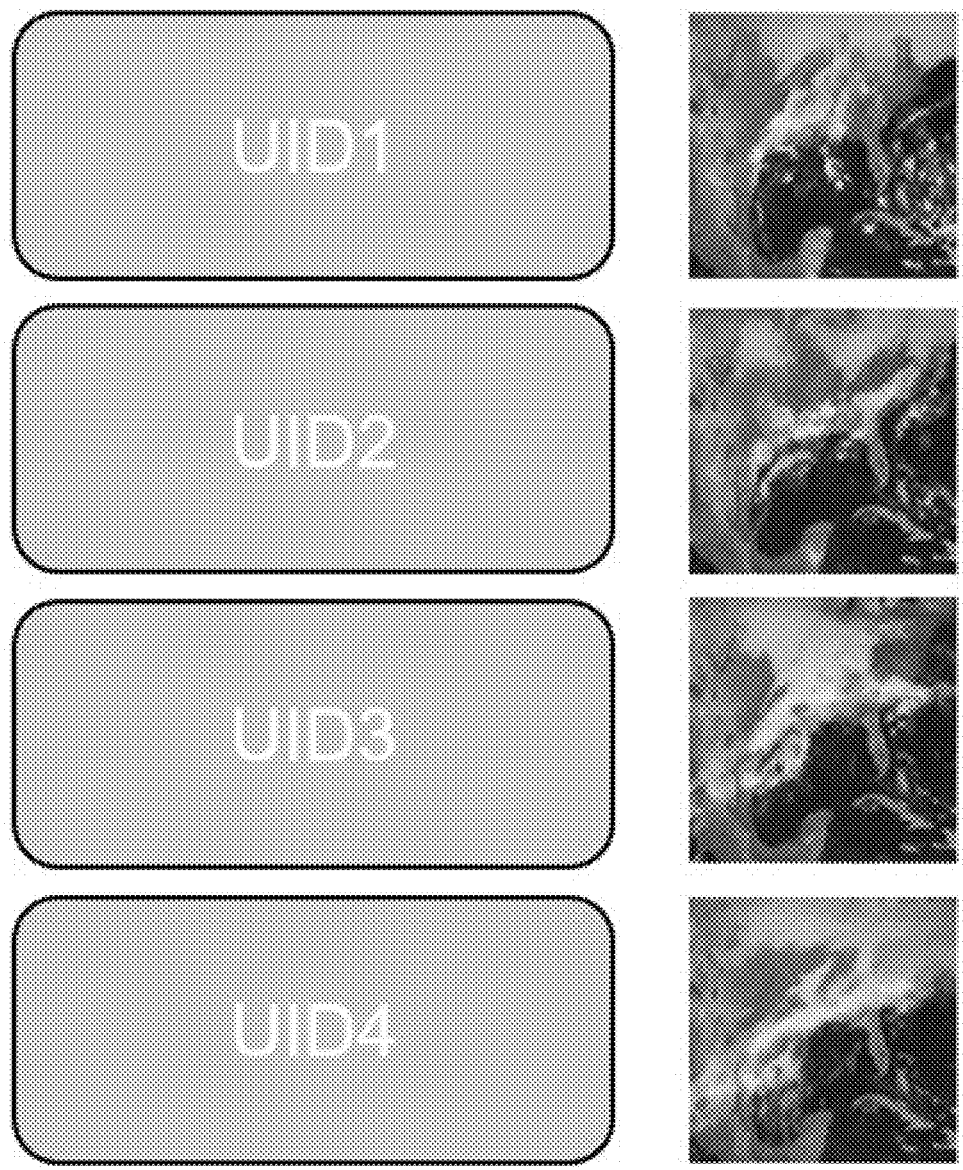
FIG. 2A illustrates UIDs for four image frames, according to an embodiment of the present invention.

Some embodiments of the present invention pertain to AI techniques that map disallowed states and enable access to those states under certain conditions through a search algorithm. In other words, some embodiments are able to cross scenario boundaries by jumping from one scenario that is less desirable or even has no solution to another scenario that is more desirable. A practical application of some embodiments is in autonomous driving situations. For instance, if a car is on a rideshare lane, the law does not allow crossing over the double yellow lines. If an exit is approaching, conventional AI would follow the rules rather than breaking the law to safely transition to the exit. On the other hand, human drivers will typically cross the double yellow lines and take the exit, and their sense of urgency to do so grows as the exit becomes ever closer.

Another scenario where conventional AI may fail to make the optimal choice is when a sudden car crash occurs ahead of a vehicle. A conventional rules-based AI system would cause the vehicle to come to an immediate stop. However, this stop may not be the safest transition (e.g., due to the deceleration forces involved, the risk of another vehicle colliding from behind, etc.). Accordingly, understanding what rules can be bent and what rules can be broken for the most beneficial outcome is important for various applications.

Accordingly, some embodiments map all possible outcomes, including at least some of those that conventional AI techniques would not consider. Such embodiments may look for the most beneficial outcome regardless of probability, and then map the solution space to find the points of closest transition between the initial starting point and the desired endpoint. Some embodiments may jump between these states in order to effect a result that cannot be realized with conventional multi-objective optimization techniques. This also enables the AI system of some embodiments to act in a reasonable way with limited information, which is more natural in real scenarios that require split-second decisions.

Another application of some embodiments is in trade negotiations. When two parties are deadlocked with no desire/ability to reach a deal, the application of some embodiments maps out all possible no-win scenarios, impossible win-win scenarios, and bridges these two states at the point of least contention (i.e., the path of least resistance). Bridging these two states enables the parties to transition between the no-win scenarios and the win-win scenarios.

FIG. 1 illustrates a progression 100 from learning to "dreaming" and "lucid dreaming," according to an embodiment of the present invention. The system is first trained how to make classifications. On that basis, the system performs a "dreaming" step that starts with a classification and yields a most probable outcome. Allows the system to engage in "lucid dreaming," where more desirable possibilities, and the paths to get there, are revealed and implemented.

Dream boundary crossing is an inherent aspect of improvisation. Current optimization techniques focus on finding pathways that naturally lead to optimized scenarios based on the rules of the system. However, there could be alternative scenarios that can be accessed if at least some previously disallowed states are potentially accessible. These boundaries are defined herein as "low probability scenarios." No-win situations (e.g., the Kobayashi Maru test in Star Trek®) show branching alternatives that lead to inevitable failure. However, winning scenarios are mapped that have no valid initial starting conditions (e.g., a "cheating" scenario such as that employed by Captain Kirk), there will be points in which opportunities arise that may enable a failure path to jump into winning scenarios. To access these scenarios, the rules of the "game" must be altered such that the impossible outcome becomes possible.

The AI of some embodiments considers otherwise "impossible" scenarios with the aim of finding a more beneficial outcome, and then maps the jumps needed to accomplish improvement or success from a failure scenario. Such embodiments enable AI to cross these boundaries as part of its regular programming sequences. This may enable applications as improvisation during music-making (neutral tasks), as well as identifying points of low probability that are "near" nodes that can lead to success (e.g., aversion to the failure path, attraction to success paths, etc.).

An algorithm described with respect to some embodiments in parent U.S. Nonprovisional patent application Ser. No. 15/798,020 was created with neutral sentiment suitable for simulation. This algorithm has been modified to enable positive and negative sentiments suitable for intelligent navigation of the decision space. The algorithm of some embodiments was further modified to alter its nearest neighbor trade space search with time, enabling it to cross dream boundaries at weak pivot points.

As with parent U.S. Nonprovisional patent application Ser. No. 15/798,020, some embodiments employ multiple unique IDs (UIDs) to map and look for adjacent, more desirable patterns. UIDs may be six numbers between 1-100 that have nearly one trillion possible combinations. As such, the UID sequence will be unique for the data. While embodiments may be applied to non-image applications (e.g., writing music), in image-based embodiments, the six-number UID may be derived from the first three principal components of a two-dimensional (2D) wavelet transform of the data (WVLT1, WVLT2, WVLT3) and the first three principal components of the DCT of the data (DCT1, DCT2, DCT3).

An example in the context of mapping weather is shown in FIGS. 2A and 2B. A sequence of UIDS 200 is produced for a sequence of satellite images. Four UIDS for frames 1-4 are shown by way of example in FIG. 2A. The UIDS for eleven frames in sequence are shown in Table 1 below.

TABLE 1

| IMAGE SEQUENCE UIDS FROM PCA | | | | | | |
|---|---|---|---|---|---|---|
| Frame: | WLT_1 | WLT_2 | WLT_3 | DCT_1 | DCT_2 | DCT_3 |
| 0 | 52 | 37 | 53 | 56 | 40 | 60 |
| 1 | 55 | 38 | 52 | 58 | 40 | 57 |
| 2 | 58 | 31 | 63 | 63 | 40 | 61 |
| 3 | 67 | 34 | 55 | 70 | 44 | 59 |
| 4 | 73 | 38 | 52 | 74 | 48 | 58 |
| 5 | 79 | 58 | 49 | 75 | 68 | 46 |
| 6 | 74 | 65 | 43 | 69 | 71 | 40 |
| 7 | 61 | 71 | 40 | 57 | 72 | 38 |
| 8 | 59 | 69 | 46 | 54 | 71 | 46 |
| 9 | 39 | 57 | 45 | 35 | 49 | 43 |
| 10 | 32 | 52 | 47 | 30 | 45 | 43 |

FIG. 2B shows a principal component path 210 of WLT_1 vs. WLT_2 for frames 0-8 in PCA space, according to an embodiment of the present invention. All six variables cannot be plotted in a 2D, so WLT_1 and WLT_2 are used for illustration purposes. WLT_1, WLT_2, and WLT_3 represent the three principal orthogonal axes of the wavelet transform. The PCA algorithm derives these orthogonal axes through analyses of the changes from a sampling of the dataset. DCT_1, DCT_2, and DCT_3 represent the three principal orthogonal axes of the discrete cosine transform (DCT).

Consolidation of PCA data sequences enables "pinch points" in PCA space that enable different paths to be taken. In this implementation, PCA space includes the six-dimensional representation of the dataset comprising of the three principal components of the wavelet transform, which are most affected by positional changes in the images, and the three principal components of the DCT, which, like the Fourier transform, are most affected by changes in shading and frequency. However, it should be noted that other image dimensions, and other representations for non-image data, may be employed without deviating from the scope of the invention. The key of some embodiments is to employ a mechanism for representing data in a manner that has a high degree of uniqueness.

FIG. 3 is a graph 300 illustrating success and failure boundaries, according to an embodiment of the present invention. As can be seen, a failure scenario 310 and a success scenario 320 are mapped in trade space, each made up of decision points and paths between them that can be taken over time. However, an initial starting point 312 is located on failure path 310. Using conventional AI techniques, starting point 312 would always lead to failure over time.

Trade space is an arbitrary representation of an underlying activity, such as trade negotiations, lanes of a freeway and corresponding actions, mapping the differences between the spot prices of gold vs. the relative cost of a mining employee and his or her associated overhead and equipment needs, etc. The relative mapping of these differences can be represented by a direct translation of the image in some embodiments, as in the case of an overhead freeway image, but can also be represented by alternate visualizations including, but not limited to, the plot of the relative cost of a mining employee vs. the spot price of gold. In one reduction to practice, a relatively simple pachinko machine sequence was used to illustrate the concept.

However, in some embodiments, different paths that do not include starting point 312 are also mapped, such as success path 320 on the right. Per the above, such embodiments look for pinch points between failure paths and success paths to determine whether a point on a failure path and a point on a success path are proximate to one another in PCA space within a certain predetermined amount. In the case of a Pachinko machine, the relative possible location of the steel ball may provide an indicator of probability—the closer the ball is to another state, the more likely it is that the other state is possible.

Figure 3B:
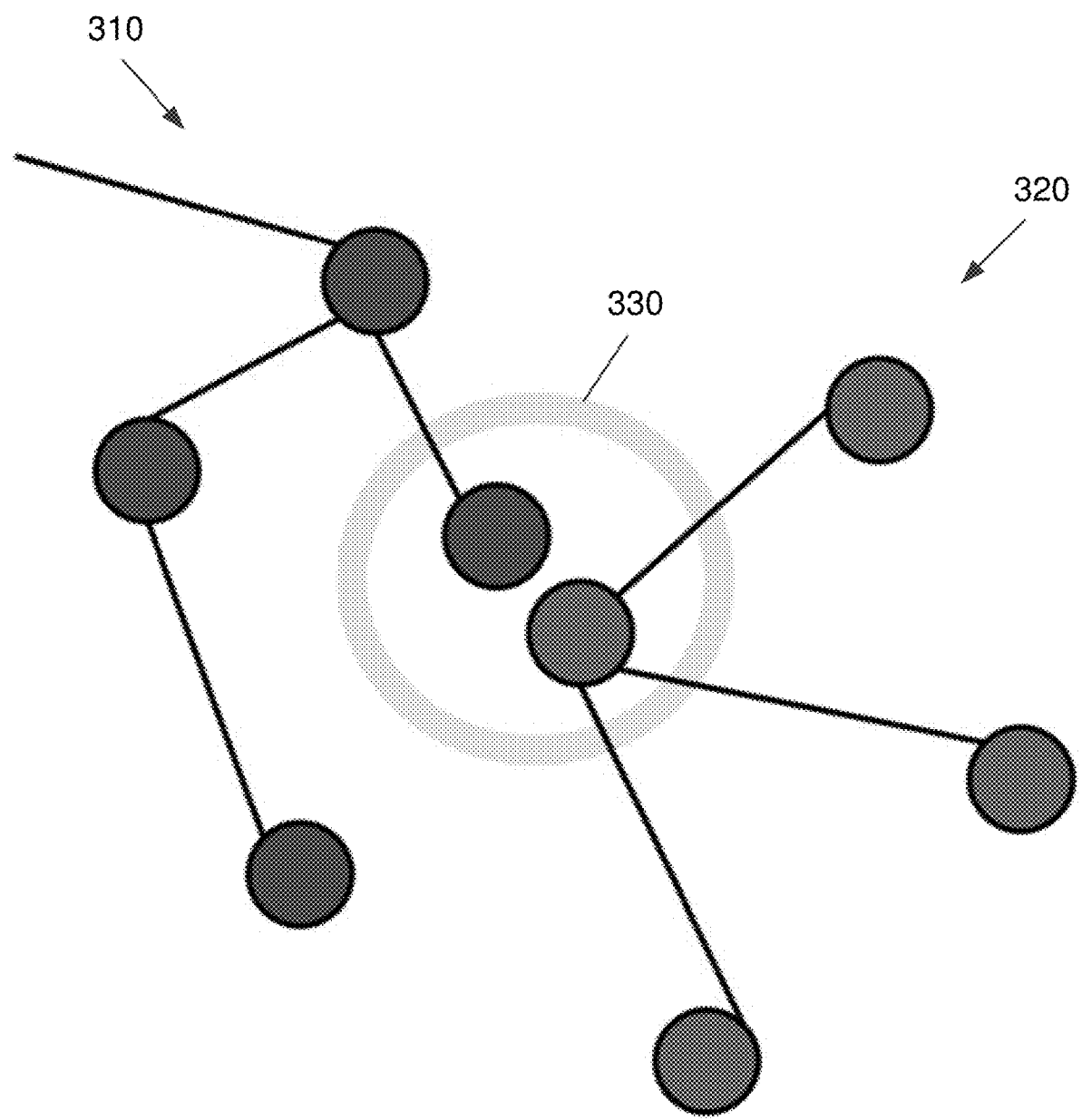
FIG. 3B illustrates an enlarged portion of the graph of FIG. 3A, according to an embodiment of the present invention.

As seen more clearly in FIG. 3B, two decision points in pinch point 330 are proximate to one another in PCA space—one from failure path 310 and the other from success path 320. The application may "jump" across from failure path 310 to success path 320 at pinch point 330. The application may be encouraged to do so by programming a bias into the logic to prefer success path decision points in pinch points. This bias may grow over time, decreasing the proximity in PCA space that is required for a pinch point. For instance, the bias may start as neutral, or even as negative towards the success path, but then shift over time to increasingly favor the success path.

Procedure to Map, Find, and Solve Decision Space

In some embodiments, trade space versus time is mapped for all scenarios, whether possible or not within the rules of the system. This may involve random seeding of time and space, and mapping of scenarios ensuing from the map. Scenarios with cohesive paths to success (e.g., a Galton box, such as in Plinko™) are more desirable, and the AI may be influenced towards these more desirable outcomes. In some embodiments, multiple success paths may be reachable, but the system may jump to the most desirable success path, or even jump from one success path to a more desirable one. The AI of some embodiments may be driven to nearby success nodes that are not on the current path through random search.

A nonlimiting example of a random search algorithm is for the AI to consider the next logical step in a previously experienced pattern and calculate the relative increase or decrease in its desirability function. Given that step, the AI would then search nearby nodes that have been experienced but have not previously shown a viable pathway. Those nodes are then evaluated by their desirability, and if a node is sufficiently high enough and close enough based on predetermined thresholds, the AI would then assume that the step is feasible and choose that step instead. However, any suitable random search technique may be used without deviating from the scope of the invention.

As seen in FIGS. 3A and 3B, mapping trade space versus time enables a 2D representation thereof. Using six number UIDs of 1-100 per node should be able to account for a sufficient number of possibilities (indeed, nearly one trillion). Utilizing PCA normalizes components to identify proximate pinch points and enable the AI to jump from one scenario to another. Use of desirable, undesirable, and neutral pathways facilitates behaviors. Desirability may be a value in some embodiments, and each node may be gradient-rated with its own desirability. Undesirability may be a value and work in a similar fashion, where nodes start as less negative and become more negative over time along the path. Comparing this to the carpool lane problem discussed above, given an alternate path towards the exit that increases in positive sentiment, the difference between the increasingly negative path and the increasingly positive path creates an increasing desire to "cheat" as the driver approaches the exit. In certain embodiments, neutral conditions may represent unalterable phenomena that cannot be change regardless of what the AI decides (e.g., a concrete barrier).

Figure 4:
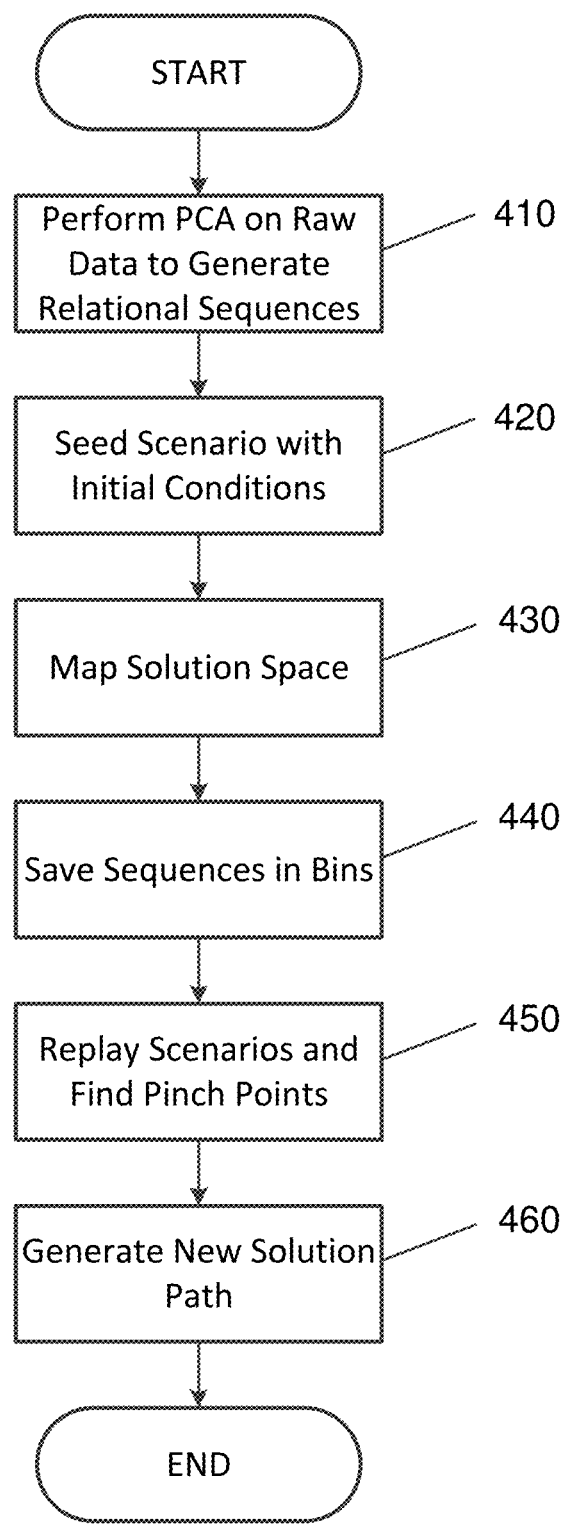
FIG. 4 is a flowchart illustrating a process for mapping disallowed states and enabling access to those states under certain conditions through a search algorithm, according to an embodiment of the present invention.

FIG. 4 is a flowchart 400 illustrating a process for mapping disallowed states and enabling access to those states under certain conditions through a search algorithm, according to an embodiment of the present invention. The process begins with performing PCA on the raw data to generate relational sequences at 410. Trade space is the underlying space in which the relative relationships are represented. More specifically, trade space is the PCA instantiation of the raw data, which is the underlying dataset. PCA is a class of algorithms that reduce the data to a representation that may include the most essential differences. Trade space relationships can be as literal as an image representation to a remapping of the space using alternative visualization techniques. Alternative visualization techniques could be relatively straightforward, like an edge detection algorithm, or more complex, like a support vector machine (SVM) or a full deep learning classification system. However, any suitable visualization technique may be used without deviating from the scope of the invention.

The scenarios are then seeded with initial conditions at 420. The initial conditions may be seeded with sampled data from the real world, which reveals various alternative paths. If the algorithm has access to a simulator, random states may be initialized to explore more preferable solutions. The solution space is then mapped at 430. In the case of a Galton box, the x-axis and y-axis represent space, and time is the sum of the sequences of the ball falling down the box.

In this embodiment, the trade space is the PCA representation of the entirety of states available to the system, which is the 6 UID numbers from 1-100, giving a possible $\sim 9 \times 10^{11}$ states. Sampling experiences (e.g., data feeds from a car with a driver) show the paths between each state. The solution is the navigation of that path to the most favorable solution. Simulation (somewhat analogous to imagination in human minds) is the mapping of the trade space in areas that have not yet been experienced. By using a simulator and initializing with random states, the experiences can be mapped.

A relatively simple example is as follows. A car is driven and data is gathered on what to do on a five-lane highway. The car knows what to do in this situation. The car is then simulated with a random initial starting point (e.g., the car is suddenly pointed backwards and is going against traffic). The simulator shows that this is a highly negative state, and through multiple runs, the AI eventually learns that the best answer is to immediately go in reverse and perform a "J" turn. The AI now knows what to do then it is driving on a freeway and gets clipped by a lane changing car, for example.

The relational sequences are then saved into positive, negative, and neutral bins at 440. More specifically, solutions that lead to positive outcomes are saved in the positive bins, solutions that lead to negative outcomes are saved in the negative bin, and solutions that lead to neutral outcomes are saved in the neutral bin. For instance, the neutral outcomes may be the default for observations of phenomena in order to simulate natural phenomena that cannot be changed.

The scenarios are then replayed to find pinch points where the path structures are "weak" (i.e., proximate to one another) and can be jumped to more favorable outcomes at 450. This enables the AI to cross rule-based boundaries and jump into new scenarios. The AI then generates a new solution path at 460 based on one or more jumps to more favorable scenarios.

Per the above, unalterable phenomena may be simulated as neutral paths. The number of times a node has been "seen" in memory may be used to increase the probability of choosing paths with that node. By relying on real-life sampling, an indication of probability can be derived. For example, if a certain basketball player is observed shooting a three-point shot 100 times, and makes the shot 23 times, one can roughly estimate that the probability of that player making a three-point shot is 23%. In essence, this sampling creates a preference towards higher probability nodes, enabling simulation of possible paths with relative probabilities.

In some embodiments, the AI is designed to enable success in scenarios where the probability of reaching a desired outcome is either low or impossible using conventional AI rules. By sorting scenarios into positive and negative bins, variable and desirable outcomes can be created. Negative decision points may be avoided, while positive decision points are encouraged. Also, when a negative node is inevitable, the chance that the AI tries to jump between states may increase. The decision from the algorithm of some embodiments is based on both probability and proximity. If the difference between a state that has a negative sentiment and a state that has a positive sentiment is large enough, and the nodes are close in proximity, then the probability that the AI will jump that state will typically be high. Probability may be linear, square, cubed, etc., depending on the implementation. "Jumps" that traverse a larger distance may occur with high positive sentiment differences.

One way to incorporate "sentiment" and occurrence frequency into nodes is to include four additional numbers into the UID. For instance, whereas the six-number UIDs discussed above use six numbers from PCA, in some embodiments, two additional numbers are used to represent sentiment and two more additional numbers are used to facilitate pattern lock—i.e., how likely the AI is to lock into a pattern including the given node. With respect to sentiment, in this embodiment, each sentiment number encodes a value from 1-100. Two numbers, with a multiplier on the second number, enable 9999 possible values to be used. More numbers, which are used in some embodiments, would provide more nuanced values to choose from.

The pattern lock is utilized in some embodiments in the case that the states are identical. This occurs, for example, in a game of rock paper scissors, where there are three states, but the sequences of rock paper scissors are what encodes the pattern of interest. The pattern lock enables repeating states to occur and still retain the sequence.

In some embodiments, the trade space is PCA imaging data that inherently represents areas that are similar as being close to one another. The sentiment numbers in the UID may also be from 1-100. To figure out the next step in the path, some embodiments use the difference between nodes of the six trade space numbers plus the two sentiment numbers multiplied together. In other words, if the six trade space numbers for a node from 1-100 are denoted A, B, C, D, E, F, and the two sentiment numbers from 1-100 are denoted G, H, then the difference between a current node X and a next node Y in the path may be found by Eq. (1) below:

$$((A_X+B_X+C_X+D_X+E_X+F_X)+(G_X \times H_X))-((A_Y+B_Y+C_Y+D_Y+E_Y+F_Y)+(G_Y \times H_Y)) \quad (1)$$

The sentiment numbers in this embodiment are multiplied by a factor that enables a balance between the spatial numbers describing trade space proximity and the values describing sentiment. There is also a distance factor that indicates how far of a jump will be performed. The distance between UID states represents the relative distance in the underlying raw data, and represents the degree of plausibility that these states can be linked with a path. However, different equations may be used without deviating from the scope of the invention, depending on the implementation. It should be noted that any range of numbers, and any collective number thereof, may be used without deviating from the scope of the invention. Furthermore, different ranges may be used for trade space versus sentiment, etc.

Figure 5:
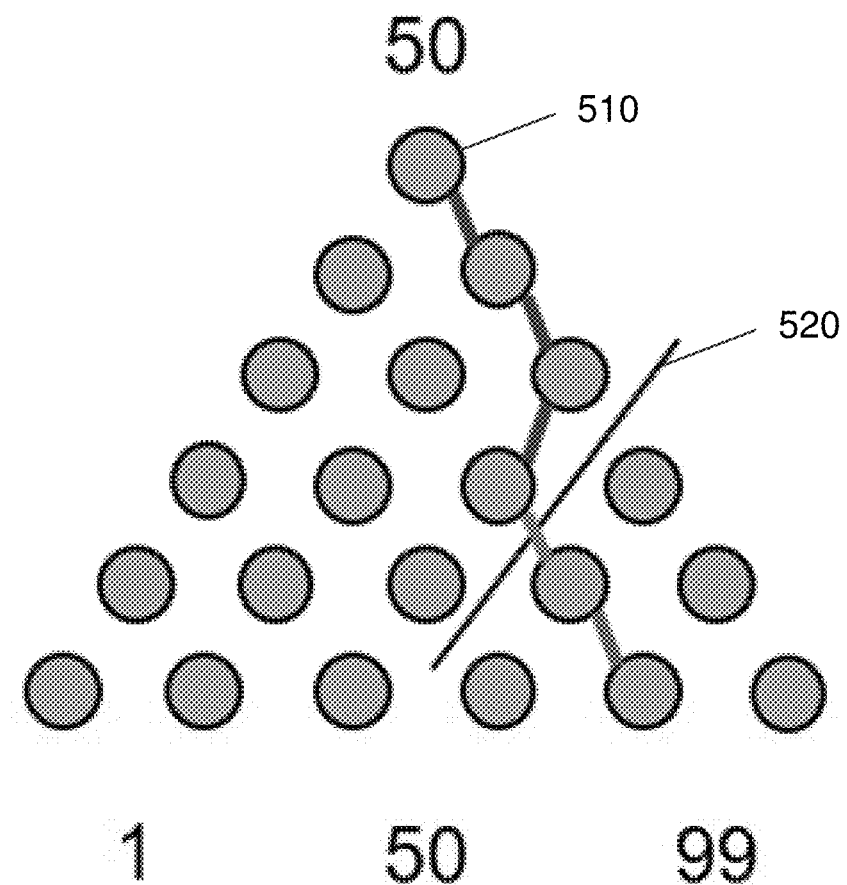
FIG. 5 illustrates an example from a computer simulation of a modified Galton box game, according to an embodiment of the present invention.

FIG. 5 illustrates an example 500 from a computer simulation of a Galton box game, according to an embodiment of the present invention. In this example, sentiment is represented by two numbers. In order to achieve higher sentiment values, the second sentiment number is multiplied by a random value between 0 and 100 such that the first sentiment number represents 1-99 and the second sentiment number represents 0-9900 in this embodiment. Binary decision points 510 (i.e., left or right) and a barrier 520 are included. There are five "steps" in this embodiment, made up of horizontal rows of decision points 510. If the game were to operate normally, the "ball" would always end up on the left side of barrier 520.

The beginning state is the state of the Galton box, which is when one puts in a steel ball at the top of the box. As the ball falls, it is attracted to the right-hand side by sentiment. In a real scenario, this could be due to magnetism, the tilt of the floor, gravity, etc. The ball encounters barrier 520, and if that state was unallowable, the ball would progress leftward. However, the algorithm can jump the barrier if the sentiment difference is sufficiently large enough, enabling the ball to "jump" the barrier and to move towards the more desirable state.

Figure 6:
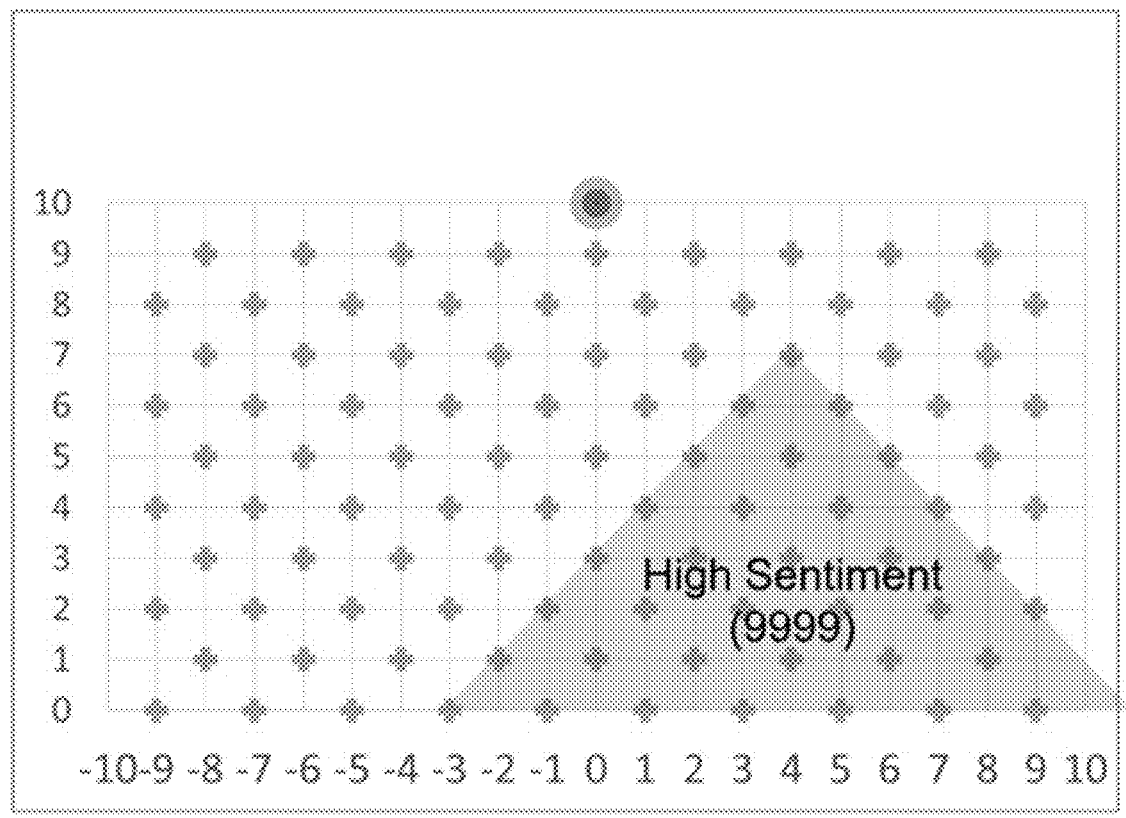
FIG. 6 illustrates a modified software-implemented Galton box, according to an embodiment of the present invention.
Figure 7:
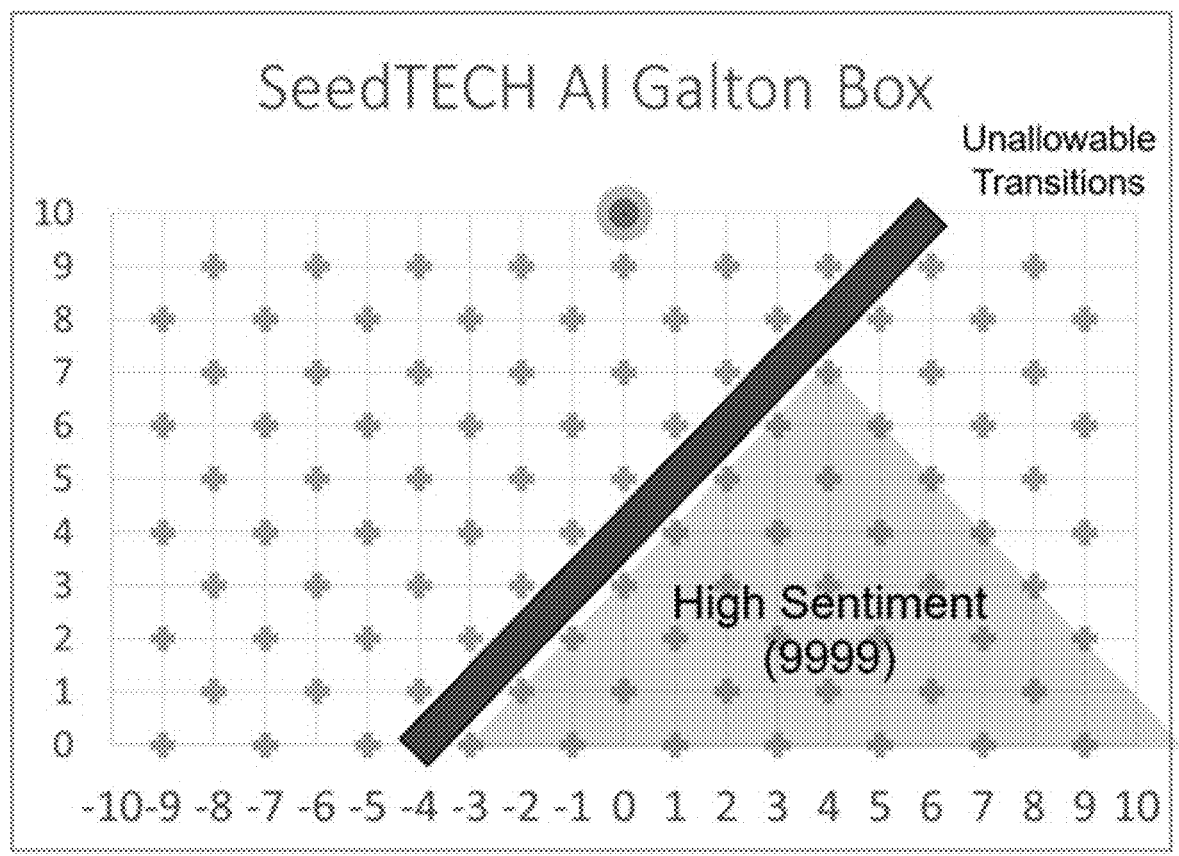
FIG. 7 illustrates another modified software-implemented Galton box, according to an embodiment of the present invention.
Figure 8:
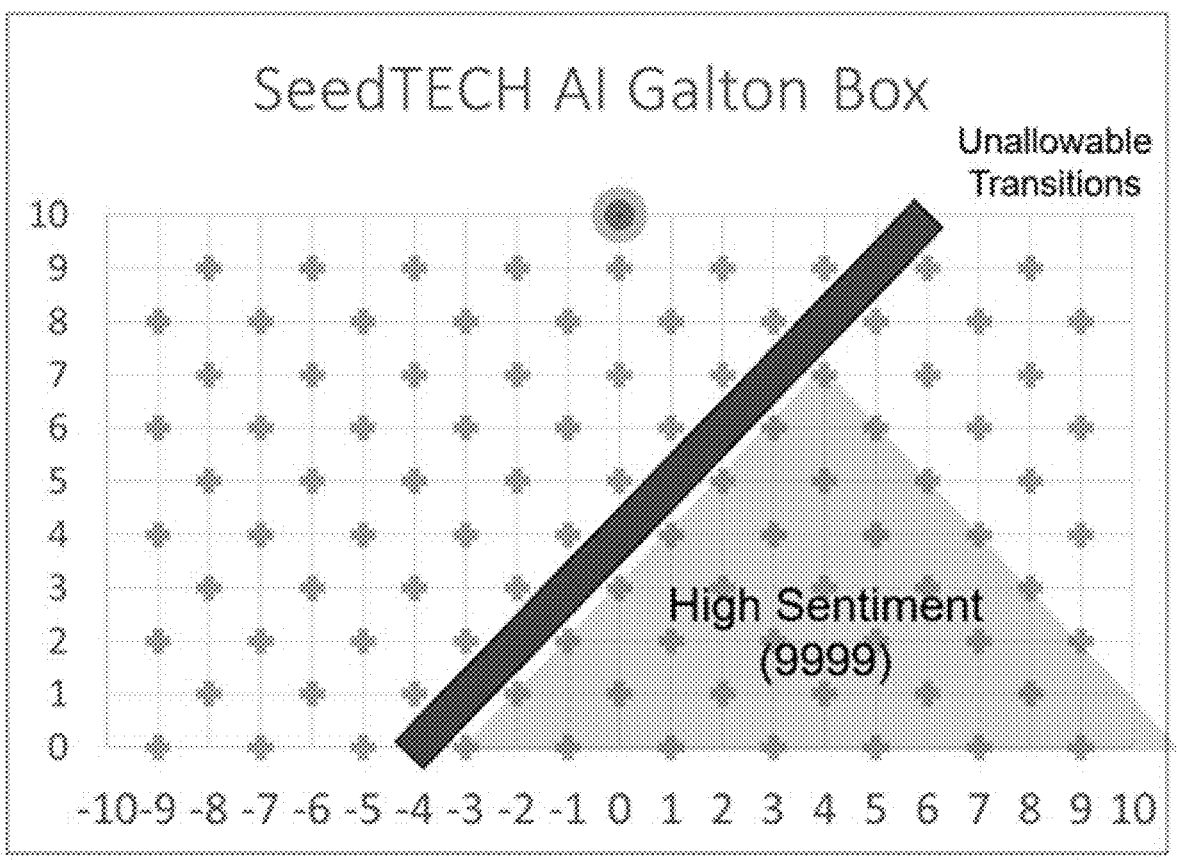
FIG. 8 illustrates yet another modified software-implemented Galton box, according to an embodiment of the present invention.

FIGS. 6-8 illustrate software-implemented Galton boxes 600, 700, 800, as well as the outcomes that ended up in each "bin". In Galton box 600 of FIG. 6, no barriers are present, but a high sentiment area represented by a triangle is provided. This causes simulated balls that approach the high sentiment area to tend to want to stay therein. Simulations that ended up in each of the eleven end bins defined by the "pegs" of row 0 are shown below Galton box 600. Similarly, simulations that ended up in each bin with an uncrossable wall (Galton box 700) and a crossable wall (Galton box 800) are shown in FIGS. 7 and 8, respectively. Table 2 below presents the results together for comparison.

TABLE 2

SIMULATIONS IN EACH BIN FOR GALTON BOXES IN FIGS. 6-8

| GB FIG. | Num. Sims | 1 | 2 | 3 | 4 | 5 | 6 | 7 | 8 | 9 | 10 | 11 |
|---|---|---|---|---|---|---|---|---|---|---|---|---|
| 6 | 454 | 1 | 4 | 23 | 27 | 0 | 75 | 130 | 107 | 62 | 25 | 0 |
| 7 | 181 | 0 | 2 | 179 | 0 | 0 | 0 | 0 | 0 | 0 | 0 | 0 |
| 8 | 207 | 1 | 3 | 108 | 0 | 0 | 0 | 12 | 39 | 31 | 3 | 0 |

A rock-paper-scissors (RPS) algorithm implementing an embodiment of the present invention also consistently came close to matching games with the top RPS algorithms from http://www.rpscontest.com/. The top algorithms in RPS contest would learn such that they beat human players over 80% of the time. The results of this embodiment versus some of the top algorithms over 200 games are shown in Table 3 below.

TABLE 3

| RPS ALGORITHM GAME RESULTS | | | |
|---|---|---|---|
| Opponent RPS Algorithm: | Wins: | Losses: | Ties: |
| Dllu1_Randomer | 86 | 90 | 24 |
| Zai_all_mix_meta | 84 | 91 | 25 |
| RPS_FA_Fix | 86 | 93 | 21 |

The RPS algorithm was implemented utilizing the same core logic to map out pattern space, predict the next move, and in this case, plot a more desirable outcome by applying the countermove to win the round. This is an example of a dynamically changing system in which the actions of the algorithm directly affect the future patterns of the opponent. In this case, the desirable path was limited to the round. However, the same Galton box code can be augmented to enable states in which the algorithm deliberately loses a round or two in order to ensure that later rounds are won more frequently. These "loss leader" strategies are enabled in the algorithm of some embodiments.

It should be noted that applications of embodiments of the present invention are not limited to self-driving cars, image recognition, trade negotiations, and music. Indeed, embodiments of the present invention may be applied for applications including, but not limited to, classification, simulation, and/or decision making.

Example Algorithm

An example algorithm of some embodiments is presented below.

(1) Look at all nodes in pattern and determine most likely node jump:
Evaluate the sentiment_difference to understand whether the predicted move is desirable using Sentiment_difference=$(100*G_x+H_x)-(100*G_y+H_y)$;

(2) From all predicted moves, choose the best (i.e., largest) sentiment difference. Note: If there is no sentiment, then it is a pure simulation and the predicted move is a random draw of the possible moves recalled.

(3) Then evaluate all jumpable nodes that are not predicted by pattern recall. It is assumed that all nodes can be accessed. It is either the case that a node has not been previously accessed or that a barrier exists between two nodes. It is not necessarily impossible to reach "unreachable" nodes. Rather, it is another way of saying that just because it has not been done does not mean it is impossible. This is done by:

For all nodes proximate to current node within a predetermined proximity:

UID_Distance=Sqrt($(A_x-A_y)^2+(B_x-B_y)^2+(C_x-C_y)^2+(D_x-D_y)^2+(E_x-E_y)^2+(F_x-F_y)^2+(G_x-G_y)^2$);

Sentiment_difference=$(100*G_x+H_x)-(100*G_y+H_y)$;

Normalization_variable=$Z$;

Consider jump if Sentiment_difference*Z>UID_Distance:
Save Sentiment_difference*Z−UID_Distance;

(4) Evaluate all nodes surrounding the current node and find the closest node with the largest positive sentiment delta. If sentiment from the possible jump is greater than the predicted sentiment (can be further constrained by limiting the actual UID_Distance considered by the algorithm), the jumpable node is used instead of the predicted node as the next move.

In this algorithm, x is the current node and y is the possible future node, whether predicted or jumpable. G is multiplied by 100 to enable 0-9900. G is summed with H to enable a value of 1-9999. This is a reduction to practice of an embodiment, but many other embodiments are possible without deviating from the scope of the invention. Indeed, the number is not limited to 1-9999, nor are the total number of dimensions fixed at 6 dimensions. Fewer or more dimensions may be used. The number of dimensions should be sufficient to adequately describe the dataset, and thus is typically dependent on the complexity of the dataset.

Figure 9:
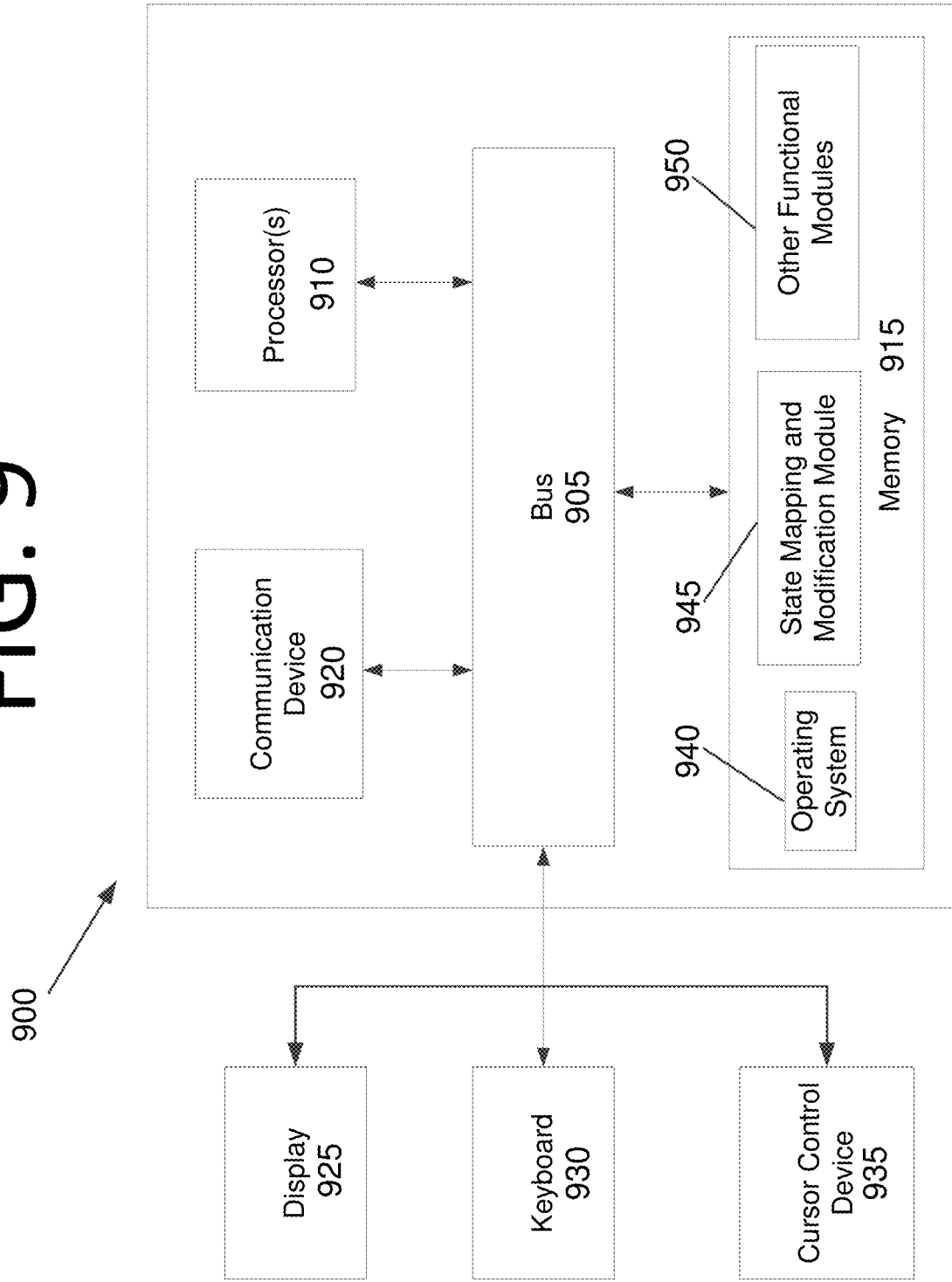
FIG. 9 illustrates a computing system configured to map disallowed states and enable access to those states under certain conditions through a search algorithm, according to an embodiment of the present invention.

FIG. 9 illustrates a computing system 900 configured to map disallowed states and enable access to those states under certain conditions through a search algorithm, according to an embodiment of the present invention. System 900 includes a bus 905 or other communication mechanism for communicating information, and processor(s) 910 coupled to bus 905 for processing information. Processor(s) 910 may be any type of general or specific purpose processor, including a central processing unit (CPU) or application specific integrated circuit (ASIC). Processor(s) 910 may also have multiple processing cores, and at least some of the cores may be configured for specific functions. System 900 further includes a memory 915 for storing information and instructions to be executed by processor(s) 910. Memory 915 can be comprised of any combination of random access memory (RAM), read only memory (ROM), flash memory, cache, static storage such as a magnetic or optical disk, or any other types of non-transitory computer-readable media or combinations thereof. Additionally, system 900 includes a communication device 920, such as a transceiver, to wirelessly provide access to a communications network.

Non-transitory computer-readable media may be any available media that can be accessed by processor(s) 910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 910 are further coupled via bus 905 to a display 925, such as a Liquid Crystal Display (LCD), for displaying information to a user. A keyboard 930 and a cursor control device 935, such as a computer mouse, are further coupled to bus 905 to enable a user to interface with system 900. However, in certain embodiments such as those for mobile computing implementations, a physical keyboard and mouse may not be present, and the user may interact with the device solely through display 925 and/or a touchpad (not shown). Any type and combination of input devices may be used as a matter of design choice.

In one embodiment, memory 915 stores software modules that provide functionality when executed by processor(s) 910. The modules include an operating system 940 for system 900. The modules further include a state mapping and modification module 945 that is configured to configured to perform the various disallowed state mapping and access enablement processes discussed herein. System 900 may include one or more additional functional modules 950 that include additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 10:
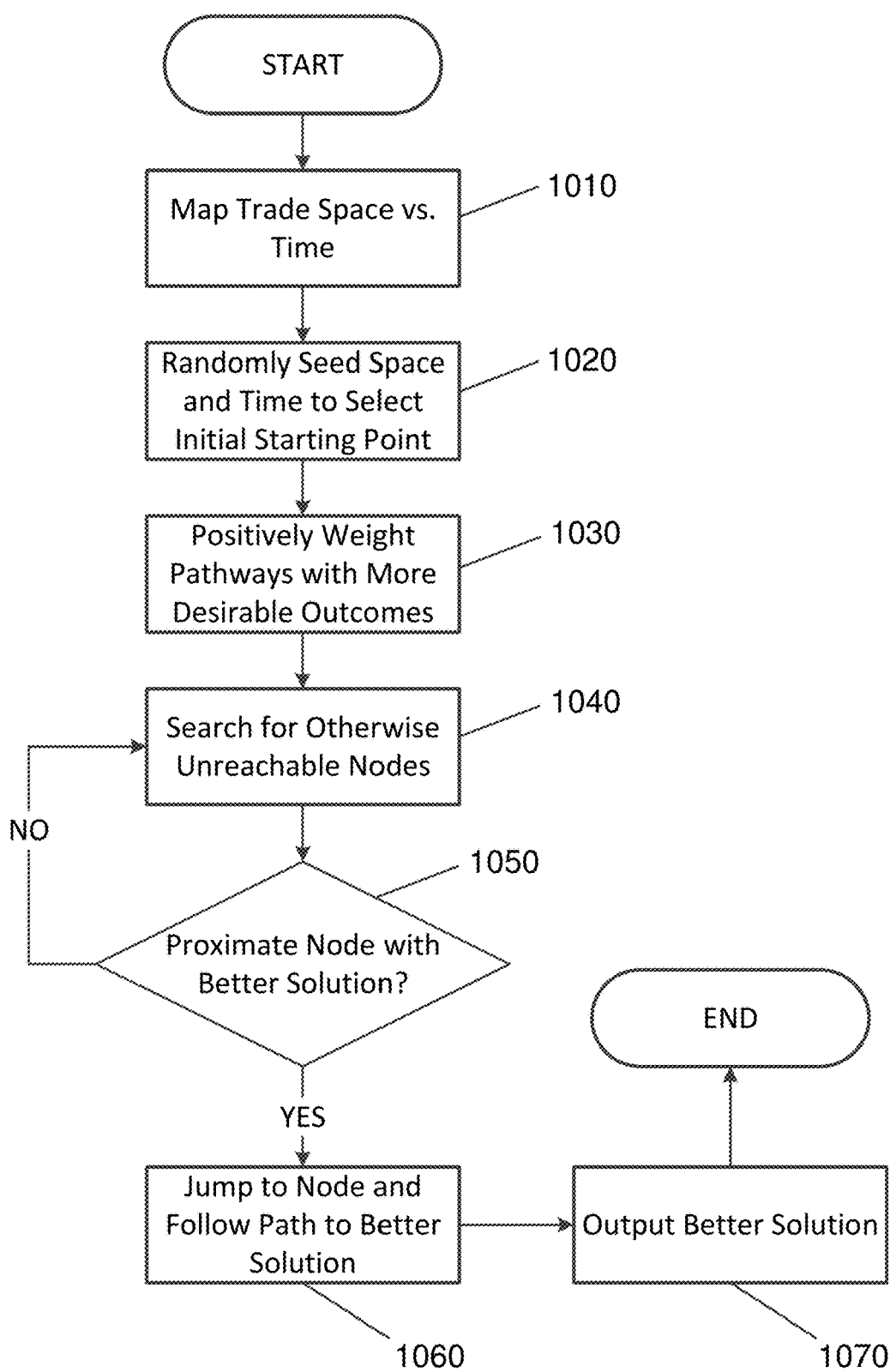
FIG. 10 is a flowchart illustrating a process for providing a path with a better solution, according to an embodiment of the present invention.

FIG. 10 is a flowchart 1000 illustrating a process for providing a path with a better solution, according to an embodiment of the present invention. The process begins with mapping trade space versus time for a plurality of scenarios at 1010. Each pathway in the plurality of scenarios includes a plurality of nodes. Space and time are randomly seeded at 1020 to select an initial possible starting point. Pathways leading more desirable outcomes are positively weighted at 1030.

While following a pathway from the initial starting point, a search is performed for nearby nodes from otherwise unreachable outcomes that provide a better solution at 1040. In some embodiments, the searching for the nearby nodes from otherwise unreachable outcomes that provide a better solution may include employing a random search for otherwise unreachable nodes that are proximate within a predetermined distance in the trade space to a current node of the pathway, but provide a better solution. When a node is found that is proximate within the predetermined distance and is associated with a pathway that provides a better solution at 1050, the system jumps to the proximate node and follows the path to the better solution at 1060. The path with the better solution is then output at 1070.

In some embodiments, trade space versus time is mapped for all scenarios. In certain embodiments, the mapping of trade space versus time includes determining unique IDs (UIDs) for each node in the map. The map may be based on image data, and the UIDs may each include six numbers that are derived from PCA of three principal components of a 2D wavelet transform of a respective image and three principal components of a DCT of the respective image. The six numbers may be between 1-100 in some embodiments. The UIDS include numbers representing sentiment in certain embodiments. In some embodiments, two numbers between 1 and 99 are used to represent sentiment, with multiplier between 0 and 100 on a second one of the two sentiment numbers such that values between 1 and 9999 are possible.

In some embodiments, two numbers of the UIDs are used to facilitate pattern lock and the pattern lock is utilized for cases where states are identical to enable repeating states to occur and still retain a sequence. In certain embodiments, upon choosing a next possible step, the system evaluates prior experiences from the pattern lock, chooses a best experienced outcome, searches adjacent UIDs that have been previously experienced or simulated, and evaluates whether a potential improvement of outcome warrants choosing a new path that has not been experienced. In some embodiments, the system jumps to a most desirable path of a plurality of paths with success outcomes, or jumps from a success path to a more desirable success path, when a node of the more desirable or most desirable success path is proximate within the predetermined distance to the current node. In certain embodiments, the pathways include positive, neutral, or negative sentiments. The pathways with neutral sentiments may become more positive or more negative as time advances. In some embodiments, the paths with better solutions are determined for self-driving cars, image recognition, trade negotiations, music, or any combination thereof.

Figure 11:
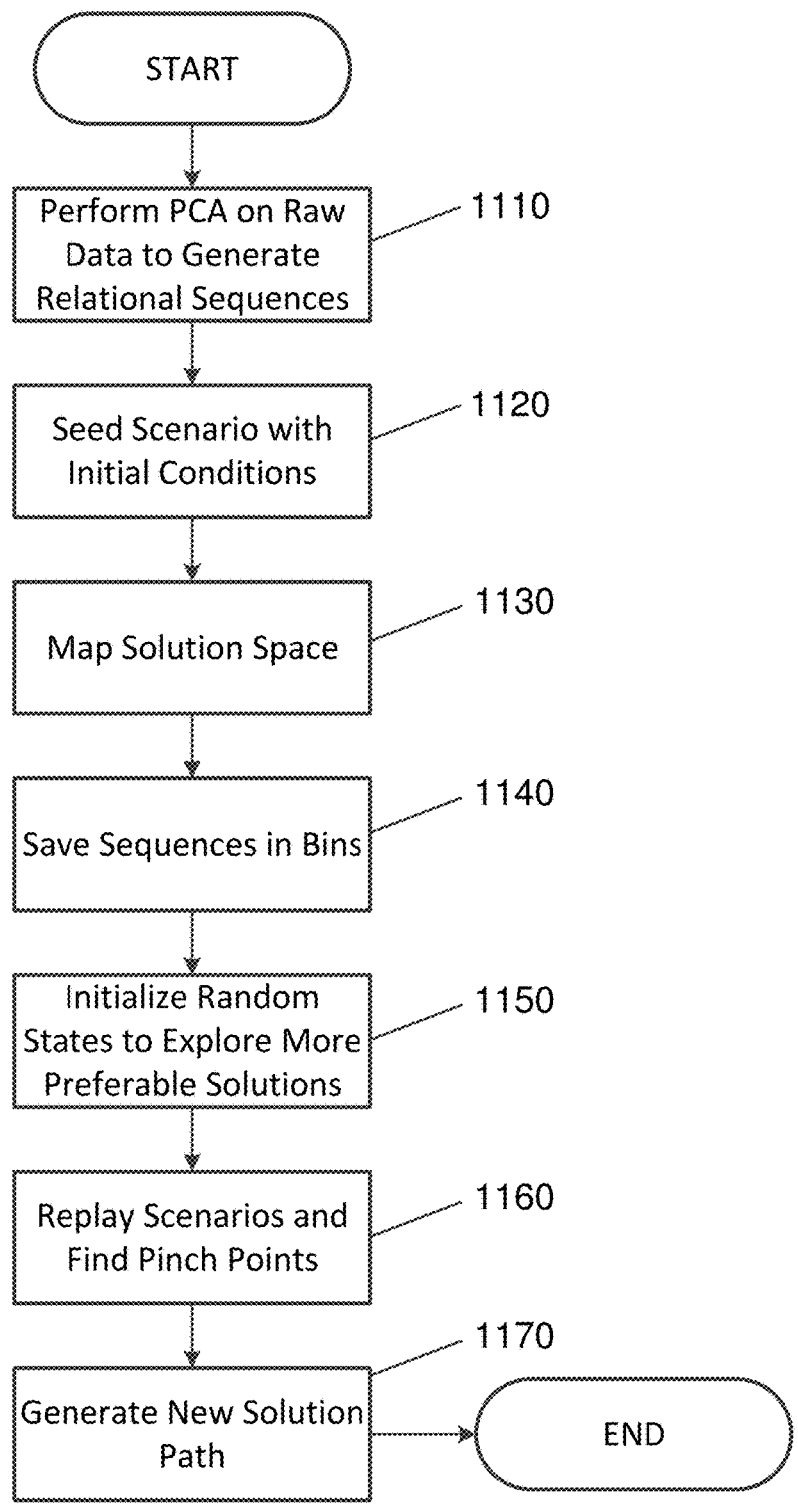
FIG. 11 is a flowchart illustrating a process for generating a new, more favorable solution path, according to an embodiment of the present invention.

FIG. 11 is a flowchart 1100 illustrating a process for generating a new, more favorable solution path, according to an embodiment of the present invention. The process begins with performing PCA on raw data at 1110 to generate relational sequences in trade space. The trade space represents relative relationships in the raw data. A plurality of scenarios are seeded with initial conditions at 1120. The initial conditions are seeded with real world data. A solution space is mapped based on the generated relational sequences at 1130.

Each relational sequence is saved into a positive, negative, or neutral bin based on its outcome at 1140. In some embodiments, the neutral bin is a default for observations of natural phenomena in order to simulate natural phenomena that cannot be changed. In certain embodiments, a frequency with which a path including a given node is chosen is correlated to a number of times that the node has appeared during past simulations. In some embodiments, when a negative note is inevitable on all paths, a chance that a jump is attempted is increased.

Random states are initialized to explore more preferable solutions at 1150. The plurality of scenarios are replayed at 1160 to determine pinch points where path structures are proximate to one another and more favorable outcomes can be jumped to. A new solution path is then generated at 1170 based on one or more jumps to more favorable outcomes.

In some embodiments, the PCA results in a UID including six numbers, with three of the six numbers resulting from principal components of a 2D wavelet transform of a respective image and another three of the six numbers resulting from principal components of a DCT of the respective image. In certain embodiments, the six numbers are between 1 and 100. In some embodiments, the UID further includes numbers representing sentiment.

In certain embodiments, the UID includes two additional numbers that are used to facilitate pattern lock, and the pattern lock is utilized for cases where states are identical to enable repeating states to occur and still retain a sequence. In some embodiments, upon choosing a next possible step, the system evaluates prior experiences from the pattern lock, chooses a best experienced outcome, searches adjacent UIDs that have been previously experienced or simulated, and evaluates whether a potential improvement of outcome warrants choosing a new path that has not been experienced. In some embodiments, the UID includes an additional two numbers between 1 and 99 that are used to represent sentiment, with a multiplier between 0 and 100 on a second one of the two sentiment numbers such that values between 1 and 9999 are possible.

FIG. 12 is a flowchart 1200 illustrating a process for providing a path with a better solution, according to an embodiment of the present invention. The process begins with reviewing all nodes in a pattern at 1210 to determine a most likely node for a jump. Next, the system evaluates whether the jump to the most likely node is desirable at 1220 using a sentiment difference between the most likely node for the jump and at least one node that Is not previously known to be a valid state, but is still proximate to the most likely node for the jump. From all predicted moves, a largest sentiment difference is chosen at 1230.

The system evaluates all jumpable nodes within a predetermined proximity that are not predicted by pattern recall at 1240. In some embodiments, the predetermined proximity is determined by a combination of a UID distance, a sentiment difference, and a normalization variable, where a jump is considered if the sentiment difference times the normalization variable is greater than the UID distance. A jumpable node within the predetermined proximity with a largest positive sentiment difference between itself and the most likely node for the jump is selected at 1250. A path with the jumpable node is then output as a path with a better solution at 1260.

The process steps performed in FIGS. 4 and 10-12 may be performed by a computer program, encoding instructions for the processor to perform at least the processes described in FIGS. 4 and 10-12, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the processor to implement the process described in FIGS. 4 and 10-12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the program configured to cause at least one processor to:
   map trade space versus time for a plurality of scenarios, whether reachable or not within rules of a system, each pathway in the plurality of scenarios comprising a plurality of nodes;
   while following a pathway from an initial starting point, search for nearby nodes from otherwise unreachable outcomes that provide a better solution;
   when a node is found that is proximate within the predetermined distance and is associated with a pathway that provides a better solution, jump to the proximate node and follow the path to the better solution; and
   output the path with the better solution, wherein
   the mapping of trade space versus time comprises determining unique IDs (UIDs) for each node in the map, and
   the UIDs comprise numbers derived from a dimensional reduction technique that provides relational meaning between unique IDs.

2. The computer program of claim 1, wherein the program is further configured to cause the at least one processor to:
   positively weight pathways leading to more desirable outcomes.

3. The computer program of claim 1, wherein the searching for the nearby nodes from otherwise unreachable outcomes that provide a better solution comprises employing a random search for otherwise unreachable nodes that are proximate within a predetermined distance in the trade space to a current node of the pathway, but provide a better solution.

4. The computer program of claim 1, wherein the program is configured to cause the at least one processor to:
   randomly seed space and time to select the initial possible starting point.

5. The computer program of claim 1, wherein trade space versus time is mapped for all scenarios.

6. The computer program of claim 1, wherein
   the map is based on image data, and
   the UIDs each comprise six numbers that are derived from principal component analysis of three principal components of a 2D wavelet transform of a respective image and three principal components of a discrete cosine transform (DCT) of the respective image.

7. The computer program of claim 6, wherein the six numbers are between 1 and 100.

8. The computer program of claim 1, wherein the UIDs comprise numbers representing sentiment.

9. The computer program of claim 1, wherein
   two numbers of the UIDs are used to facilitate pattern lock, and
   the pattern lock is utilized for cases where states are identical to enable repeating states to occur and still retain a sequence.

10. The computer program of claim 9, wherein upon choosing a next possible step, the program is further configured to cause the at least one processor to:
    evaluate prior experiences from the pattern lock;
    choose a best experienced outcome;
    search adjacent Urns that have been previously experienced or simulated; and
    evaluate whether a potential improvement of outcome warrants choosing a new path that has not been experienced.

11. The computer program of claim 1, wherein two numbers between 1 and 99 are used to represent sentiment, with multiplier between 0 and 100 on a second one of the two sentiment numbers such that values between 1 and 9999 are possible.

12. The computer program of claim 1, wherein
    the UIDs comprise six spatial numbers denoted A, B, C, D, E, F representing the trade space and two numbers denoted G, H representing sentiment, and
    a difference between a current node X and a next node Y is given by:

$$((A_X+B_X+C_X+D_X+E_X+F_X)+(G_X \times H_X))-((A_Y+B_Y+C_Y+D_Y+E_Y+F_Y)+(G_Y \times H_Y)).$$

13. The computer program of claim 12, wherein the sentiment numbers G, H are multiplied by a factor that enables a balance between the six spatial numbers A, B, C, D, E, F describing trade space proximity and the two sentiment numbers G, H.

14. The computer program of claim 1, wherein the program is configured to cause the at least one processor to jump to a most desirable path of a plurality of paths with success outcomes, or jump from a success path to a more desirable success path, when a node of the more desirable or most desirable success path is proximate within the predetermined distance to the current node.

15. The computer program of claim 1, wherein the pathways comprise positive, neutral, or negative sentiments.

16. The computer program of claim 15, wherein the pathways with neutral sentiments become more positive or more negative as time advances.

17. The computer program of claim 1, wherein the program determines paths with better solutions for self-driving cars, image recognition, trade negotiations, music, or any combination thereof.

* * * * *